3,533,934
METHOD FOR DEHYDRATING NACREOUS
PIGMENT PLATELETS
Louis Armanini, Pleasantville, N.Y., assignor to The
Mearl Corporation, Ossining, N.Y., a corporation of
New Jersey
No Drawing. Filed May 24, 1968, Ser. No. 731,726
Int. Cl. B01d 12/00
U.S. Cl. 204—180                                    5 Claims

ABSTRACT OF THE DISCLOSURE

Basic lead carbonate platelets suitable for use in nacreous pigments are dehydrated by dispersion in a water-miscible solvent and collecting the platelets by settling, the settling rate being increased by the passage of a direct electric current through the dispersion.

BACKGROUND OF THE INVENTION

The invention relates to an improved method for dehydrating basic lead carbonate platelets so as not to impair the platelet quality desired for nacreous pigments.

Nacreous basic lead carbonate, a synthetic pearlescent pigment, consists of extremely thin, hexagonal crystalline platelets. These platelets are generally less than one micron in thickness and range from 3 to 50 microns in diameter.

Basic lead carbonate platelets of highest brilliance are grown with extremely smooth surfaces and with the desired dimensions. Such platelets are described in U.S. Pat. No. 2,950,981, owned by applicant's assignee. Typically, they have a diameter of from about 3 to 50 microns, and a thickness of from about 10 to 100 millimicrons with greater thicknesses, up to about 1,000 millimicrons being obtained where it is desired to have a thicker crystal which will give a color effect obtained through interference phenomena (see U.S. Pat. No. 3,123,485, also assigned to applicant's assignee).

The smooth-surfaced basic lead carbonate platelets often display a tendency to adhere to one another. It is therefore necessary that the high quality basic lead carbonate nacreous pigment of commerce be a suspension or paste of platelets in a liquid vehicle, which keeps the crystals individually dispersed. This liquid vehicle must be compatible with the specific medium in which the pigment will be used.

Basic lead carbonate crystal platelets are usually grown in an aqueous solution. Most uses of nacreous basic lead carbonate, however, require that the platelets be dispersed in an organic medium. For example, basic lead carbonate intended for use in a nitrocellulose coating is commonly provided as a paste in nitrocellulose lacquer. On the other hand, a suspension in a polyester-containing vehicle is commonly used for casting in polyester or other resins. Similarly, a paste in polyvinyl chloride lacquer is the appropriate nacreous pigment for use in vinyl coating. The basic lead carbonate platelets in these formulations generally range from 35 to 80% by weight, the remainder of the nacreous pigment formulation being the organic vehicle.

In transferring the platelets which are grown in an aqueous mother liquor to the organic vehicle, the water which might adhere to the platelets must be removed. This process is referred to herein as "dehydration." One known method of dehydration is flushing, wherein an aqueous paste of the crystal platelets in stirred with an organic vehicle which is not miscible with water. If the proper vehicle is chosen, the platelets are preferentially wetted by the organic vehicle, and pass into the organic phase to form a paste, the water being released and removed. An example of this method is the flushing of aqueous basic lead carbonate platelets into nitrocellulose lacquer, the solvent of which is water-immiscible, e.g., butyl acetate. The process is often assisted by the use of an appropriate surfactant. The more effective flushing media contain polymers, such as cellulose derivatives, polyesters, etc.

The flush method has the disadvantage that it requires an effective flushing vehicle which is also compatible with the ultimate application for the platelets. Basic lead carbonate which has been flushed into nitrocellulose lacquer may be used for coating in nitrocellulose, but for few other purposes. It is very difficult to find effective, compatible flushing vehicles for certain other systems, such as vinyl lacquer and cellulose acetate lacquer. A further disadvantage of the flush method is that some lowering of quality occurs, because there is some fragmentation of crystals during the mixing and handling of the viscous paste. In addition, some crystals may adhere to one another, forming undesirable agglomerates.

In another type of dehydration, water is displaced by a water-miscible solvent. The simplest version is filtration and washing. The washed filter cake is dispersible in an organic vehicle.

This method works most readily with basic lead carbonate crystal platelets of relatively poor quality. Higher quality crystals leaf or mat on the filter, and filtration is, therefore, much too slow. Furthermore, high quality platelets tend to agglomerate because of their smooth surfaces with the result that the luster which is obtainable from the dehydration product is not fully up to the quality inherent in the platelets themselves.

The difficulties of filtration can be avoided by dispersing the aqueous paste in a water-miscible solvent, and centrifuging. The dehydration is effected by one or more washes of this type. This method is most effective for basic lead carbonate platelets of moderate quality as crystals of the highest quality tend to be degraded by agglomeration as they pack in the centrifugal field and fragmentation may occur in handling the stiff centrifuge paste.

The disadvantages of the centrifuge method can be overcome by settling the crystals by gravity. The crystals are slurried in a water-miscible solvent two or more times, and are collected after each slurry by settling. The pigment which is made by this procedure retains its full nacreous luster, since the method is gentle enough to avoid any agglomeration or fragmentation. However, because the platelets settle so slowly after the first wash, the method is mainly useful for small laboratory preparations.

SUMMARY OF THE INVENTION

This invention deals with a new method for the dehydration of nacreous pigment platelets, specifically basic lead carbonate crystal platelets. The method makes it possible to produce a number of basic lead carbonate formulations which formely had to be limited to laboratory scale operations. In removing water by this method, an aqueous paste or slurry of basic lead carbonate platelets is diluted with a water-miscible organic solvent. The supernate is decanted after the platelets have settled, and the procedure is repeated. The rate of settling is greatly increased by passing an electric current through the suspension, as ordinary settling is too slow to be of practical use in manufacturing. Thus, it is possible for the first time to make a basic lead carbonate nacreous pigment of the highest quality for use in a medium-like cellulose acetate, and to manufacture this pigment in a practical and rapid manner.

The two electrodes, which may conveniently be of stainless steel, need merely be immersed in the suspension, and do not have to be at opposite ends of the containing vessel. Thus, it is not necessary for the current to pass through the entire body of the suspension. The electrodes should extend in the suspension approximately to the level which will be attained by the settled platelets since the acceleration effect is not significant below the level of the electrodes.

The electrodes may both be in the form of rods, plates, or other known shapes. In a more complicated arrangement, one electrode is a vertical rod at the center of the suspension and the other follows the contours of the vertical walls of the vessel.

The electrodes may be of stainless steel. Other suitable materials are carbon, platinum, aluminum, Monel metal, or any other conductors which do not react with the system.

As will appear in the example below, settling is considerably slower in a second solvent wash in which the water concentration is already low than in the first solvent wash where a larger quantity of water is still present. The use of the current is, therefore, primarily of use in the final wash or washes. Furthermore, the suspension which is subjected to the current should contain less than 10%, and preferably less than 5% water. Otherwise, the flow of current might be excessive leading to reactions at the electrodes.

The basic lead carbonate crystals which appear to be positively charged migrate toward the negative electrode, and tend to accumulate on this electrode. A convenient way of avoiding this build-up is to reverse the polarity of the two electrodes at intervals during the course of the settling. The settling rate is not appreciably affected by the changing polarity. Clean electrodes have been obtained over a wide range of reversal cycles, that is, from 3 to 480 reversals per hour, without reducing the settling rate. The frequency of reversal does not appear critical, and reversals 6 to 15 times per hour have been convenient and effective. However, reversals at the frequency of alternating current, i.e., 60 cycles per second, prevent the increase in settling rate.

The temperature of the suspension, during the passage of current is usually below 50° C. and is preferably in the range of ambient temperature to 35° C. In any event the temperature must be maintained below the boiling point of the solvent.

The water-miscible solvents which may be used alone or in combination, include acetone; the lower alcohols, e.g., methanol, ethanol, propanol, and isopropanol; the alcohol ethers, e.g., ethylene glycol monomethyl ether, diethylene glycol monomethyl ether, ethylene glycol monoethyl, diethylene glycol monoethyl, ethylene glycol monobutyl ether, and diethylene glycol monobutyl ether; and esters, e.g., the aceates of ethylene glycol monomethyl ether and diethylene glycol monomethyl ether.

Partially water-miscible solvents are also useful, for example, methyl ethyl ketone, although, on the whole, completely water-miscible solvents are preferred. The preferred solvents, are ethylene glycol monomethyl ether and ethylene glycol monoethyl ether because of their greater tendency to maintain individual dispersion of the crystals. Ethylene glycol monomethyl ether is used in the example given below, which illustrates the application of the invention.

PREFERRED EMBODIMENTS OF THE INVENTION

A convenient small-scale apparatus consists of a cylindrical glass vessel 11.5 inches in diameter and 18 inches high. Two electrodes consisting of rectangular stainless steel plates 24 in. x 6 in. x 1/32 in, are mounted in a vertical position parallel to one another and 6 inches apart, and are placed in the vessel so that the bottom edges of the electrodes are 2.5 inches from the bottom of the vessel. The electrodes are disposed symmetrically about the central axis of the cylindrical vessel. The electrodes are held in place by non-conducting supports.

A slurry is prepared by adding 19.0 kg. of ethylene glycol monomethyl ether to 9.5 kg. of an aqueous paste consisting of 70% basic lead carbonate crystals and 30% water. The water contains about 0.1% basic lead acetate and the pH is about 7.0. The suspension is transferred to the cylindrical vessel, in which it reaches a height of 13.5 inches.

Settling will occur in this suspension, which still contains considerable water, without the use of an electric current. After 24 hours, 19.0 kg. of supernate are withdrawn, leaving a 70% slurry in a solution of water in ethylene glycol monomethyl ether. The water content has been reduced from 30% to 3.9% by weight.

A fresh quantity of ethylene glycol monomethyl ether (19.0 kg.) is now added, and the suspension is made uniform. A D-C voltage of 450 volts is now impressed on the electrodes, one of which is negative and the other positive. The current flow is 22 ma. The D-C potential from a power supply is fed to a timer and switch and then to the electrodes, so that the latter are reversed in polarity every 5 minutes to prevent the accumulation of basic lead carbonate crystals on either electrode.

The crystals settle rapidly, a nearly clear supernate forming at an initial rate of 2 inches per hour. During the course of the settling, this rate decreases, and the current is observed to rise to 32 ma. After 16 hours of operation, the crystals are well packed in a layer 2.5 inches high at the bottom of the vessel. The current is switched off, and the supernate removed, leaving approximately 9.5 kg. of a slurry consisting of 70% basic lead carbonate crystals in ethylene glycol monomethyl ether. The water content has been reduced to a total of 0.5% by weight in the 70% slurry.

A control dehydration was run which was identical with the above procedure, except that no current was used during the settling from the second solvent wash. The time required for the crystals to settle back to a 70% slurry was 120 hours instead of 16 hours with the aid of the electric current. Thus, the settling rate with the current was 7.5 times greater than without.

The rate of settling is a function of the current. For example, the use of 125 volts in the above setup produces a current of 5 ma., and the initial settling rate is 0.75 in. per hour. If the electrodes are moved closer to one another and the voltage is maintained at 450 volts, the current rises and the rate of settling is increased. With the electrodes 2 in. apart, the initial current is 34 ma., at 450 volts, and settling to 70% occurs within 9 hours. The final current is about 63 ma. Similarly, if the position of the electrodes remains constant and the voltage is increased, the settling rate is increased. The suspension tends to become warm at the higher voltages. To obtain the most rapid settling rates, it is desirable to provide a cooling coil or cooling jacket in order to avoid excessive solvent vapor-pressure.

The 70% dehydrated slurry is readily converted into useful basic lead carbonate nacreous pigment formulation by dilution with appropriate vehicles. For example, a paste containing 35% basic lead carbonate in cellulose acetate lacquer is made by diluting 50 grams of the 70% slurry with 50 grams of a lacquer consisting of 10% cellulose acetate (Eastman E-398-3) in the acetate ester of ethylene glycol monomethyl ether. The basic lead carbonate crystals are found to be unimpaired: they are neither fragmented, etched, nor agglomerated by the dehydrating procedure. The resulting paste is stable and readily dispersed in cellulose acetate coating systems or cellulose acetate plastics.

For applications which may be very water-sensitive, the water content of the 70% slurry can be reduced further by using a higher solvent-to-slurry ratio or by using additional solvent washes. The settling rates obtained with the current are about the same for third and fourth washes, as described above for the second wash.

It is convenient to settle a suspension to a concentration of 70% platelets, by weight, but settling to any concentration in the range of about 50% to about 80% is suitable. The higher the concentration, the more effective the water removal, but the longer the time required for the final packing.

Although this invention has been described with respect to its preferred embodiments, it should be understood that many variations and modifications will now be apparent to those skilled in the art, and it is preferred, therefore, that the scope of the invention be limited not by the specific disclosure herein, but only by the appended claims.

I claim:
1. A method for the dehydration of platelets suitable for use in nacreous pigments comprising:
   (a) suspending and settling said platelets in a water-miscible solvent, and removing the supernatant liquid therefrom,
   (b) re-suspending said platelets in aditional quantities of a water-miscible solvent and re-setting said platelets by passing an electric current through said suspension,
   (c) separating dehydrated platelets from said solvent, and
   (d) incorporating said platelets in a nacreous pigment vehicle.
2. The method of claim 1 in which the nacre-producing platelets are basic lead carbonate.
3. The method of claim 2 in which the electric current passed through the platelet suspension is periodically reversed.
4. The method of claim 3 in which the electric current is passed through a suspension of platelets maintained between ambient temperature and about 50° C.
5. The method of claim 4 in which the electric current is passed through a platelet suspension wherein said suspension contains not more than about 10% by weight of water.

References Cited
UNITED STATES PATENTS

| | | | |
|---|---|---|---|
| 670,350 | 3/1901 | Schwerin | 204—180 |
| 2,057,156 | 10/1936 | Lyons | 204—180 |
| 2,085,537 | 6/1937 | Lyons | 233—18 |
| 2,740,756 | 4/1956 | Thomas | 204—180 |
| 2,944,952 | 7/1960 | McMinn | 204—180 |
| 3,449,227 | 6/1969 | Heron et al. | 204—180 |

JOHN H. MACK, Primary Examiner

A. C. PRESCOTT, Assistant Examiner